United States Patent
Ji et al.

(10) Patent No.: US 11,997,644 B2
(45) Date of Patent: May 28, 2024

(54) HANDLING OF PAGING MESSAGES IN COMMUNICATION ENDPOINT TO NETWORK RELAYING SCENARIOS

(71) Applicant: Nokia Technologies Oy, Espoo (FI)

(72) Inventors: Lianghai Ji, Aalborg (DK); Frank Frederiksen, Klarup (DK); Claudio Rosa, Randers (DK); Erika Portela Lopes De Almeida, Aalborg (DK); Morten Toft, Svenstrup (DK); Johannes Hejselbaek, Aalborg (DK); Faranaz Sabouri-Sichani, Aalborg (DK); Bo Holm Bjerrum, Nibe (DK); Samantha Caporal Del Barrio, Aalborg (DK); Roberto Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 396 days.

(21) Appl. No.: 17/628,247

(22) PCT Filed: Jul. 23, 2019

(86) PCT No.: PCT/EP2019/069768
§ 371 (c)(1),
(2) Date: Jan. 19, 2022

(87) PCT Pub. No.: WO2021/013337
PCT Pub. Date: Jan. 28, 2021

(65) Prior Publication Data
US 2022/0322283 A1    Oct. 6, 2022

(51) Int. Cl.
*H04W 68/02* (2009.01)
*H04W 4/08* (2009.01)
*H04W 72/04* (2023.01)

(52) U.S. Cl.
CPC ............ *H04W 68/02* (2013.01); *H04W 4/08* (2013.01); *H04W 72/04* (2013.01)

(58) Field of Classification Search
CPC ... H04W 4/08; H04W 52/0229; H04W 68/02; H04W 72/04; H04W 76/14; H04W 88/04
See application file for complete search history.

(56) References Cited

U.S. PATENT DOCUMENTS

| | | |
|---|---|---|
| 9,661,683 B2 | 5/2017 | Horneman et al. |
| 2018/0249516 A1 | 8/2018 | Jung et al. |

(Continued)

FOREIGN PATENT DOCUMENTS

| | | |
|---|---|---|
| EP | 2712215 A2 | 3/2014 |
| EP | 3512267 A1 | 7/2019 |

(Continued)

OTHER PUBLICATIONS

"3rd Generation Partnership Project; Technical Specification Group Services and System Aspects; enhanced Relays for Energy Efficiency and Extensive Coverage; Stage 1 (Release 17)", 3GPP TR 22.866, V0.1.0, Nov. 2018, pp. 1-12.

(Continued)

*Primary Examiner* — Kashif Siddiqui
(74) *Attorney, Agent, or Firm* — Barta Jones, PLLC

(57) ABSTRACT

There are provided measures for handling of paging messages in communication endpoint to network relaying scenarios. Such measures exemplarily comprise, at a relay terminal connected to a mobile access entity of a cellular network systems, selecting, for a terminal to be relayed, a sidelink communication group of a set of configured sidelink communication groups, monitoring network-served paging indicator resources corresponding to said terminal to be relayed for a network-served paging related identifier indica- (Continued)

tive of transmission of a network-served paging message and information on network-served paging message resources for said transmission of said network-served paging message, transmitting, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-sewed paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message, and transmitting said inter-terminal paging message in said inter-terminal paging message resources for said transmission of said inter-terminal paging message.

19 Claims, 14 Drawing Sheets

(56) References Cited

U.S. PATENT DOCUMENTS

| | | | | |
|---|---|---|---|---|
| 2019/0373579 | A1* | 12/2019 | Nord | H04W 76/10 |
| 2020/0045660 | A1* | 2/2020 | Lee | H04W 72/20 |
| 2020/0068380 | A1* | 2/2020 | Wallentin | H04W 76/14 |
| 2021/0314830 | A1* | 10/2021 | Chang | H04W 36/0009 |
| 2022/0210698 | A1* | 6/2022 | Ly | H04W 4/70 |

FOREIGN PATENT DOCUMENTS

| | | |
|---|---|---|
| GB | 2555662 A | 5/2018 |
| WO | 2018/084788 A1 | 5/2018 |
| WO | 2018/137284 A1 | 8/2018 |
| WO | 2018/145872 A1 | 8/2018 |

OTHER PUBLICATIONS

"3rd Generation Partnership Project; Technical Specification Group Radio Access Network; Study on further enhancements to LTE Device to Device (D2D), User Equipment (UE) to network relays for Internet of Things (IOT) and wearables; (Release 15)", 3GPP TR 36.746, V15.1.1, Apr. 2018, pp. 1-55.

"3rd Generation Partnership Project; Technical Specification Group Radio Access Network; NR; User Equipment (UE) procedures in Idle mode and RRC Inactive state (Release 15)", 3GPP TS 38.304, V15.3.0, Mar. 2019, pp. 1-29.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

International Search Report and Written Opinion received for corresponding Patent Cooperation Treaty Application No. PCT/EP2019/069768, dated Mar. 16, 2020, 19 pages.

"Paging via Relay", 3GPP TSG RAN WG2 Meeting #98, R2-1704824, Agenda: 9.1.2.2, Sony, May 15-19, 2017, 4 pages.

Office action received for corresponding Indian Patent Application No. 202247008200, dated Jul. 14, 2022, 7 pages.

* cited by examiner

HANDLING OF PAGING MESSAGES IN COMMUNICATION ENDPOINT TO NETWORK RELAYING SCENARIOS

RELATED APPLICATION

This application claims priority to PCT Application No. PCT/EP2019/069768, filed on Jul. 23, 2019, each of which is incorporated herein by reference in its entirety.

FIELD

The present invention relates to handling of paging messages in communication endpoint to network relaying scenarios. More specifically, the present invention exemplarily relates to measures (including methods, apparatuses and computer program products) for realizing handling of paging messages in communication endpoint to network relaying scenarios.

BACKGROUND

The present specification generally relates to scenarios with a first communication endpoint (terminal) being out-of-coverage of a cellular mobile network and a second communication endpoint (terminal) being within coverage of the cellular mobile network, where data traffic between the first communication endpoint (terminal) and the cellular mobile network is relayed via the second communication endpoint (terminal).

In $3^{rd}$ Generation Partnership Project (3GPP) technical report (TR) 22.866, different use cases and application scenarios to apply user equipment (UE) as a relay device for other UEs are illustrated. Using a UE as a relay has the benefit to provide an extended network coverage without deploying additional network infrastructures.

For instance, a fire brigade might execute its operation in a hospital building, and the firemen might need to go down to the cellar where there is no cellular network coverage. In this scenario, the out-of-coverage communication device of a fireman is referred as a remote UE, since it experiences a high path loss value from a base station (BS). Thus, in order to provide network connection to the remote UE, one communication device located between the BS and the remote UE can act as a UE-to-Network relay (relay terminal) and set up a relay link with the remote UE (terminal to be relayed) using sidelink (SL) communication over the PC5 interface. With the help from the relay link, the data traffic of the remote UE can be exchanged with the network via the UE-to-Network relay.

Further use cases are defined in TR 22.866, e.g. for enhancing coverage in industrial environments, in containers, in wagons, for elderly healthcare, etc.

In 3GPP Release 10, a low-power relay node (RN) was introduced to extend network coverage. The RN in Release 10 is not a normal UE. It supports the generic evolved NodeB (eNB) functionalities and, therefore, it acts as the eNB to serve its connected UEs. In addition, the low-power RN needs to be deployed by the network operator intentionally.

UE-to-Network relay has been standardized in 3GPP Release 13 to extend network coverage for the remote UE. In Release 13, the UE-to-Network relay is a normal UE, which can use SL communication to communicate with a remote UE and relay the data packets between the BS and the remote UE.

According to document US 2018/0249516 A1, a relay UE relaying the transmission from a remote UE to the network may be considered as another target by the remote UE. The source BS may decide to use the relay UE that relays data traffic from the remote UE to the network when the remote UE has the valid version of the master information block (MIB), system information block 1 (SIB1), and system information block 2 (SIB2). This shows how to provide a relay link between the BS and the remote UE by SL communication.

In document U.S. Pat. No. 9,661,683B2, steps of scheduling data transmission between mobile terminals utilizing the discontinuous reception (DRX) mode of the mobile terminals are disclosed. Device-to-Device (D2D) communication can be configured to transmit during the time that two D2D ends are in the sleeping or power saving mode. According to this document, both the two ends of the D2D link should be under the network coverage, e.g., they can receive the signals transmitted over Physical Downlink Control Channel (PDCCH).

According to document EP 2 712 215 A2, a paging method is developed to reduce the signaling overhead of system paging and save system paging resources. According to this document, if there is a paging message received from the core network (CN), the BS can decide whether the paging should be forwarded by a relay UE or it should be transmitted directly from the BS to the UE. This method can be used for triggering the initial location update procedure at a UE.

According to document WO 2018/137284 A1, it is proposed to set up a fixed delay value for each paging message to be transmitted in the SL. The relay UE in this case reads paging messages for different remote UEs and forwards the paging messages of different remote UEs in independent time occasions configured for forwarding the respective paging message.

In the ongoing 3GPP Release 16 vehicle-to-everything (V2X) communication concept, SL communication for the proximity-service (ProSe) UE-to-Network relay is considered. It is expected that SL capabilities (beyond V2X) will be studied in Release 17 or beyond. Looking back at Release 15, TR 36.746 studied on further enhancements on UE-to-Network relay for Internet-of-Things (IoT). In particular, Section 5.1.2 in TR 36.746 describes the protocol enhancement aspects for supporting the evolved UE-to-Network relay in Long Term Evolution (LTE). For example, in order for the remote UE to receive its paging message via the UE-to-Network relay, three paging options have been studied. It is expected that the option 2 is selected as a paging solution for further work in LTE. Option 2 taken from TR 36.746 reads as follows:

Option 2: The evolved ProSe UE-to-Network Relay UE monitors its linked evolved ProSe Remote UE's PO (paging occasion) in addition to its own PO. The evolved ProSe Remote UE does not need to attempt paging reception over downlink while linked to the evolved ProSe UE-to-Network Relay UE. The evolved ProSe UE-to-Network Relay UE may need to monitor multiple paging occasions. The evolved ProSe UE-to-Network Relay UE has to know the paging occasion of the evolved ProSe Remote UE and has to decode a paging message and determine which evolved ProSe Remote UE the paging is for. Also, the evolved ProSe UE-to-Network Relay UE may need to relay the evolved ProSe Remote UE's paging over short range link. This option is shown in FIG. 5.1.2.2-2

FIG. 10 shows a schematic diagram of an example of a system environment with signaling variants. In particular, FIG. 10 illustrates the concept of the above-outlined Option 2 (paging for evolved ProSe remote UE) discussed in 3GPP TR 36.746.

Here, it is noted that TR 36.746 does not specify the approach for a relay UE to forward the received paging message via SL.

According to 3GPP technical specification (TS) 38.304, the paging occasion (PO) is the time instance that a UE wakes up from sleeping to check if there is a paging message for it. The PO of a UE is derived as a function of several parameters, e.g., the UE paging cycle (i.e., denoted as T), a parameter denoted as nB that is configured in the system information block 2 (SIB2), and also the UE identifier (i.e., denoted as UE_ID). Here, T is determined either by the shortest UE-specific DRX cycle or by a default DRX value broadcasted in system information. In addition, the UE_ID should be derived by using other identifiers. For instance, as described in 3GPP TS 38.331, if a UE resides in the RRC_Inactive mode, its RRC_Inactive-radio network temporary identifier (I-RNTI) is used to derive the UE_ID for radio access network (RAN) paging, while its 5G-serving temporary mobile subscriber identifier (5G-S-TMSI) should be used to derive the UE_ID for CN paging.

Based on the above parameters (i.e., T, nB, and UE_ID), each UE can derive the time-and-frequency positions (time-and-frequency resources, resources) of its POs, and it will monitor those POs to search for the paging-radio network temporary identifier (P-RNTI). The P-RNTI has a single fixed value of "FFFE", and it indicates that there might be a paging message on the PDSCH for the monitoring UE. If the UE finds the P-RNTI, it will proceed to decode the resource allocation information from the PDCCH.

The resource allocation information will direct the UE to the physical downlink shared channel (PDSCH) where the paging message is carried.

By reading the paging message, the UE can check whether its identity is included in the paging records list or not. If yes, the UE can make sure that the paging message is for itself and take the corresponding action. Otherwise, the UE will return to sleep until the next paging occasion.

In case a remote UE is out of network coverage, it can set up a SL connection with a UE-to-Network relay, which is a mobile device under the network coverage. In this case, the remote UE can receive its paging message via the linked UE-to-Network relay, if the UE-to-Network relay is aware of the POs of the remote UE. In that case, the UE-to-Network relay needs to monitor the POs of the remote UE.

In case there is a paging message for the remote UE, the UE-to-Network relay will forward the paging message in the next PO of the remote UE, as this is the time when the remote UE will wake up and listen to the radio link.

FIG. 11 shows a schematic diagram of an example of a system environment with signaling variants. In particular, FIG. 11 illustrates the signaling flow of the above-outlined procedure of forwarding paging messages of a remote UE in POs of the remote UE. While the signaling flow is illustrated for two involved remote UEs, there can be more than two remote UEs associated to one UE-to-Network Relay.

The above-outlined procedure of forwarding paging messages of a remote UE in POs of the remote UE bears the following problems and drawbacks, which are also derivable from FIG. 11.

1. Once the UE-to-Network relay receives the paging message of a linked remote UE (e.g., remote UE #1 in FIG. 11), the UE-to-Network relay will forward the received paging message on the next PO (for remote UE #1) where the remote UE (remote UE #1 in FIG. 11) wakes up from sleeping. This is due to the fact that the UE-to-Network relay cannot receive and forward the same packet simultaneously (in the same PO). The timing relationship between receiving and forwarding the paging message leads to an additional delay with the value of a paging cycle T.

2. Because the remote UEs are out of network coverage, they are not synchronized with the UE-to-Network relay when they wake up to monitor their POs. Thus, before transmitting a paging message via the SL, the UE-to-Network relay needs to send a SL synchronization signal (SLSS) at first. In addition, since the POs of the remote UEs are randomly distributed in the time domain, the transmissions of the received paging messages at the UE-to-Network relay will also be distributed in the time domain. Thus, bundling a SLSS transmission with each paging message transmission will increase the energy consumption at UE-to-Network relay.

Hence, the problem arises that in particular (but not exclusively) implementing the approach according to the above-discussed "Option 2" (paging for ProSe remote UE) of 3GPP TR 36.746 results in a high energy consumption at the relay UE.

Hence, there is a need to provide for handling of paging messages in communication endpoint to network relaying scenarios. In particular, there is a need to provide for completion and enhancement of the paging solution for the ProSe remote UEs according to the above-discussed "Option 2" of 3GPP TR 36.746.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of a relay terminal connected to a mobile access entity of a cellular network system, the method comprising selecting, for a terminal to be relayed, a sidelink communication group of a set of configured sidelink communication groups, monitoring network-served paging indicator resources corresponding to said terminal to be relayed for a network-served paging related identifier indicative of transmission of a network-served paging message and information on network-served paging message resources for said transmission of said network-served paging message, and transmitting, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message.

According to an exemplary aspect of the present invention, there is provided a method of a terminal to be relayed by a relay terminal connected to a mobile access entity of a cellular network system, the method comprising receiving, from said relay terminal, information on inter-terminal paging indicator resources configured for a sidelink communication group selected for said terminal to be relayed, and monitoring said inter-terminal paging indicator resources for an inter-terminal paging related identifier indicative of transmission of an inter-terminal paging message.

According to an exemplary aspect of the present invention, there is provided a method of a mobile access entity of a cellular network system, the method comprising configuring delay information indicative of a maximum allowed delay for paging message forwarding towards terminals to be relayed, and transmitting said delay information to a relay terminal connected to said mobile access entity.

According to an exemplary aspect of the present invention, there is provided an apparatus of a relay terminal connected to a mobile access entity of a cellular network system, the apparatus comprising selecting circuitry configured to select, for a terminal to be relayed, a sidelink communication group of a set of configured sidelink communication groups, monitoring circuitry configured to monitor network-served paging indicator resources corresponding to said terminal to be relayed for a network-served paging related identifier indicative of transmission of a network-served paging message and information on network-served paging message resources for said transmission of said network-served paging message, and transmitting circuitry configured to transmit, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring circuitry, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message.

According to an exemplary aspect of the present invention, there is provided an apparatus of a terminal to be relayed by a relay terminal connected to a mobile access entity of a cellular network system, the apparatus comprising receiving circuitry configured to receive, from said relay terminal, information on inter-terminal paging indicator resources configured for a sidelink communication group selected for said terminal to be relayed, and monitoring circuitry configured to monitor said inter-terminal paging indicator resources for an inter-terminal paging related identifier indicative of transmission of an inter-terminal paging message.

According to an exemplary aspect of the present invention, there is provided an apparatus of a mobile access entity of a cellular network system, the apparatus comprising configuring circuitry configured to configure delay information indicative of a maximum allowed delay for paging message forwarding towards terminals to be relayed, and transmitting circuitry configured to transmit said delay information to a relay terminal connected to said mobile access entity.

According to an exemplary aspect of the present invention, there is provided an apparatus of a relay terminal connected to a mobile access entity of a cellular network system, the apparatus comprising at least one processor, at least one memory including computer program code, and at least one interface configured for communication with at least another apparatus, the at least one processor, with the at least one memory and the computer program code, being configured to cause the apparatus to perform selecting, for a terminal to be relayed, a sidelink communication group of a set of configured sidelink communication groups, monitoring network-served paging indicator resources corresponding to said terminal to be relayed for a network-served paging related identifier indicative of transmission of a network-served paging message and information on network-served paging message resources for said transmission of said network-served paging message, and transmitting, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message.

According to an exemplary aspect of the present invention, there is provided an apparatus of a terminal to be relayed by a relay terminal connected to a mobile access entity of a cellular network system, the apparatus comprising at least one processor, at least one memory including computer program code, and at least one interface configured for communication with at least another apparatus, the at least one processor, with the at least one memory and the computer program code, being configured to cause the apparatus to perform receiving, from said relay terminal, information on inter-terminal paging indicator resources configured for a sidelink communication group selected for said terminal to be relayed, and monitoring said inter-terminal paging indicator resources for an inter-terminal paging related identifier indicative of transmission of an inter-terminal paging message.

According to an exemplary aspect of the present invention, there is provided an apparatus of a mobile access entity of a cellular network system, the apparatus comprising at least one processor, at least one memory including computer program code, and at least one interface configured for communication with at least another apparatus, the at least one processor, with the at least one memory and the computer program code, being configured to cause the apparatus to perform configuring delay information indicative of a maximum allowed delay for paging message forwarding towards terminals to be relayed, and transmitting said delay information to a relay terminal connected to said mobile access entity.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient relay of paging messages from the network towards remote UEs (terminals to be relayed) to thereby solve at least part of the problems and drawbacks identified in relation to the prior art.

By way of exemplary embodiments of the present invention, there is provided handling of paging messages in communication endpoint to network relaying scenarios. More specifically, by way of exemplary embodiments of the present invention, there are provided measures and mechanisms for realizing handling of paging messages in communication endpoint to network relaying scenarios.

Thus, improvement is achieved by methods, apparatuses and computer program products enabling/realizing handling of paging messages in communication endpoint to network relaying scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
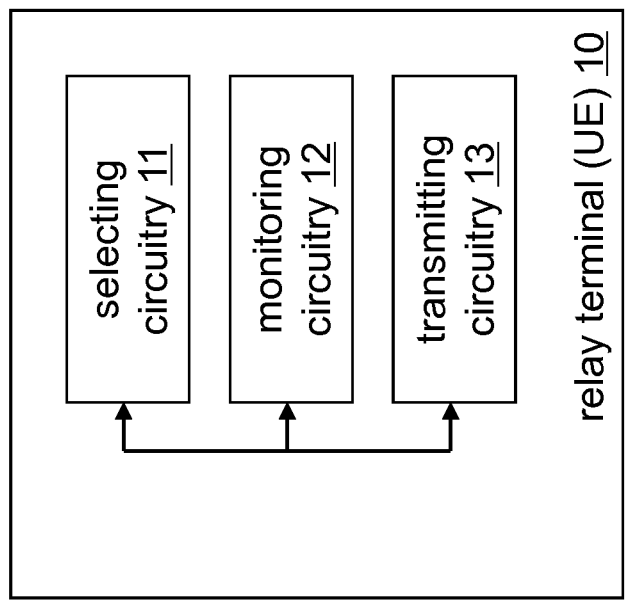
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) handling of paging messages in communication endpoint to network relaying scenarios.

According to the above-discussed "Option 2" of 3GPP TR 36.746 and according to above-discussed document WO 2018/137284 A1, each paging message to be transmitted in the SL is subject to a delay. The relay UE in this case reads the paging message and forwards the paging message in a time occasion that is configured for forwarding the paging message. In particular, the relay UE forwards the paging messages of different remote UEs in independent time occasions. Therefore, the relay UE neither processes the paging message nor aggregates multiple paging messages. This potentially leads to a high energy consumption at the relay UE, as pointed out above.

Exemplary embodiments of the present invention differ from such approach in particular in that the network configures the value for a maximal allowed delay for relaying the paging message, and the relay UE (relay terminal) configures SL Group POs to aggregate paging messages between two consecutive SL Group POs (of the same SL Group), the relay UE does not only read the paging message, but also processes and generates a new paging message by aggregating multiple paging messages received between two consecutive SL Group POs (of the same SL Group), instead of sending the paging message, the relay UE sends an indicator together with the resource allocation information for the paging message in the SL Group PO, which allows the remote UE (terminal to be relayed) to derive if it should proceed to read the paging message.

Namely, in generic terms, according to exemplary embodiments of the present invention, methods for a UE-to-Network relay to send the paging messages of its linked remote UEs via the SL and corresponding involved apparatuses are provided.

Basically, exemplary embodiments of the present invention address the two major problems described, i.e., the added delay due to the paging cycle time of the remote UE and the increased energy consumption in particular at the relay terminal.

Further, according to exemplary embodiments of the present invention, PO (paging occasion, i.e., network-served paging indicator resources) denotes the time occasion for a UE to wake up and monitor the PDCCH in the cellular downlink, while a SL Group PO (sidelink group paging occasion, i.e., sidelink group paging resources, i.e., inter-terminal paging indicator resources) denotes the time occasion for a remote UE to wake up and monitor the SL in order to check if there is an upcoming paging message.

In sum, according to exemplary embodiments of the present invention, first, the network configures the maximal allowed delay for the UE-to-Network relay (i.e., relay terminal) to forward a received paging message to the corresponding remote UE (i.e., terminal to be relayed), which has already set up a SL connection with the UE-to-Network relay.

Secondly, according to exemplary embodiments of the present invention, the UE-to-Network relay configures a list of the SL Group POs and assigns one from that list to each linked remote UE. As an example, the UE-to-Network relay can select the SL Group PO, which directly follows the PO of the remote UE. The selected SL Group PO will be transmitted and assigned to the remote UE.

Thirdly, according to exemplary embodiments of the present invention, between two consecutive SL Group POs, the UE-to-Network relay monitors the POs of its linked remote UEs in the cellular downlink. Based on the received paging messages from the cellular downlink, the UE-to-Network relay generates a new paging message, which contains only the information of its linked remote UEs that were paged between the two consecutive SL Group POs.

Fourthly, according to exemplary embodiments of the present invention, before a SL Group PO, the UE-to-Network relay transmits the SLSS. Following that, the sidelink-paging-radio network temporary identifier (SL-P-RNTI) is sent in the SL Group PO via SL. The SL-P-RNTI is a fixed value to indicate that there will be a paging message in the SL for the monitoring remote UEs to read.

Fifth, according to exemplary embodiments of the present invention, each remote UE wakes up before its assigned SL Group PO, to obtain the synchronization signals from the UE-to-Network relay by receiving the SLSS. Afterwards, it proceeds to monitor the SL and search for the SL-P-RNTI in the SL Group PO.

Subsequently, exemplary embodiments of the present invention are described in more detail.

Figure 7:
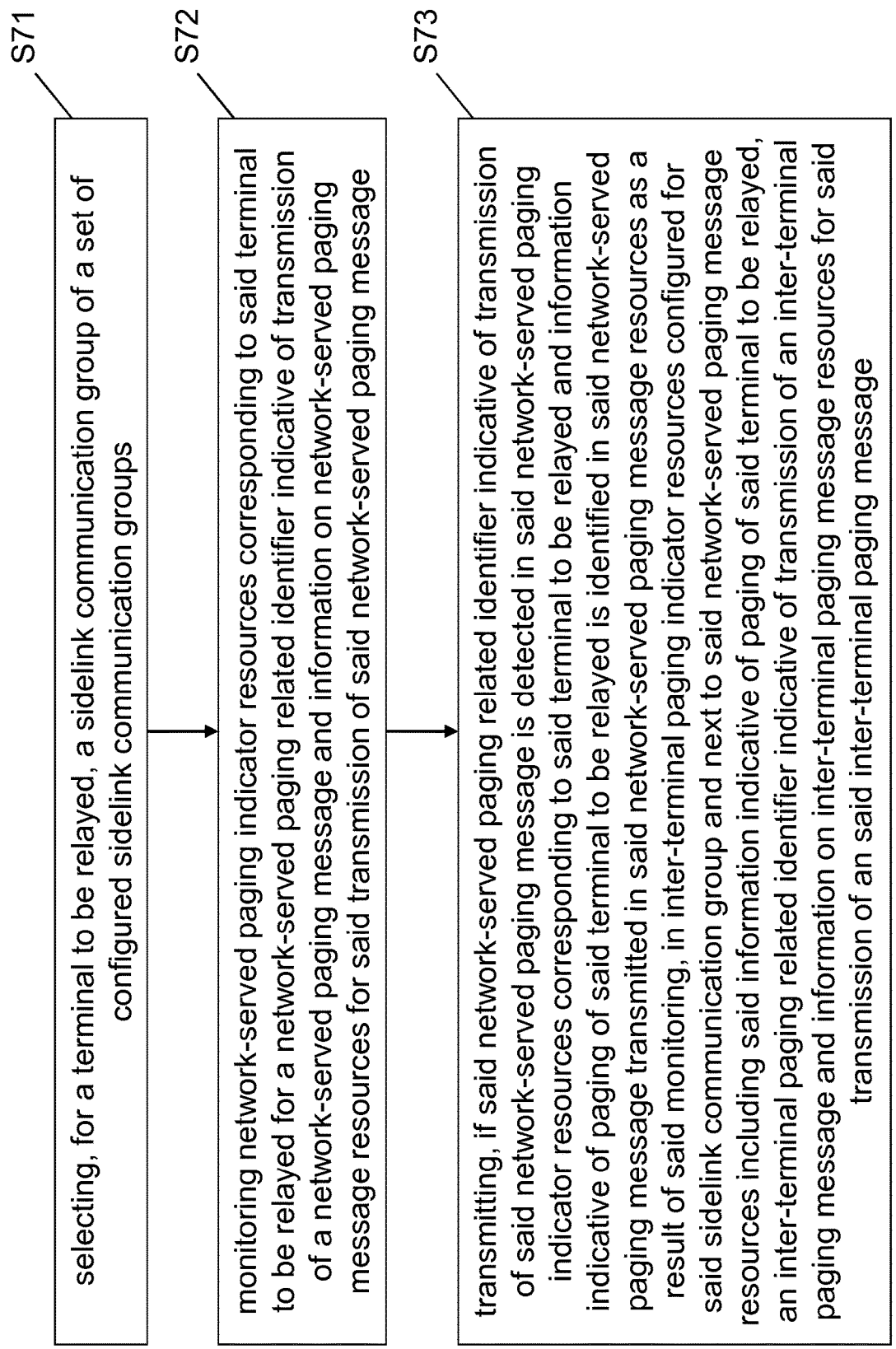
FIG. 7 is a schematic diagram of a procedure according to exemplary embodiments of the present invention.

FIG. 1 is a block diagram illustrating an apparatus according to exemplary embodiments of the present invention. The apparatus may be a relay terminal (such as a UE) 10 connected to a mobile access entity of a cellular network system and may comprise a selecting circuitry 11, a monitoring circuitry 12, and a transmitting circuitry 13. The selecting circuitry 11 selects, for a terminal to be relayed, a sidelink communication group of a set of configured sidelink communication groups. The monitoring circuitry 12 monitors network-served paging indicator resources corresponding to said terminal to be relayed for a network-served paging related identifier indicative of transmission of a network-served paging message and information on network-served paging message resources for said transmission of said network-served paging message. The transmitting circuitry 13 transmits, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring circuitry 12, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message. FIG. 7 is a schematic diagram of a procedure according to exemplary embodiments of the present invention. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure (of a relay terminal connected to a mobile access entity of a cellular network system) according to exemplary embodiments of the present invention comprises an operation of selecting (S71), for a terminal to be relayed, a sidelink communication group of a set of configured sidelink communication groups, an operation of monitoring (S72) network-served paging indicator resources corresponding to said terminal to be relayed for a network-served paging related identifier indicative of transmission of a network-served paging message and information on network-served paging message resources for said transmission of said network-served paging message, and an operation of transmitting (S73), if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring (S72), in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message.

Figure 2:
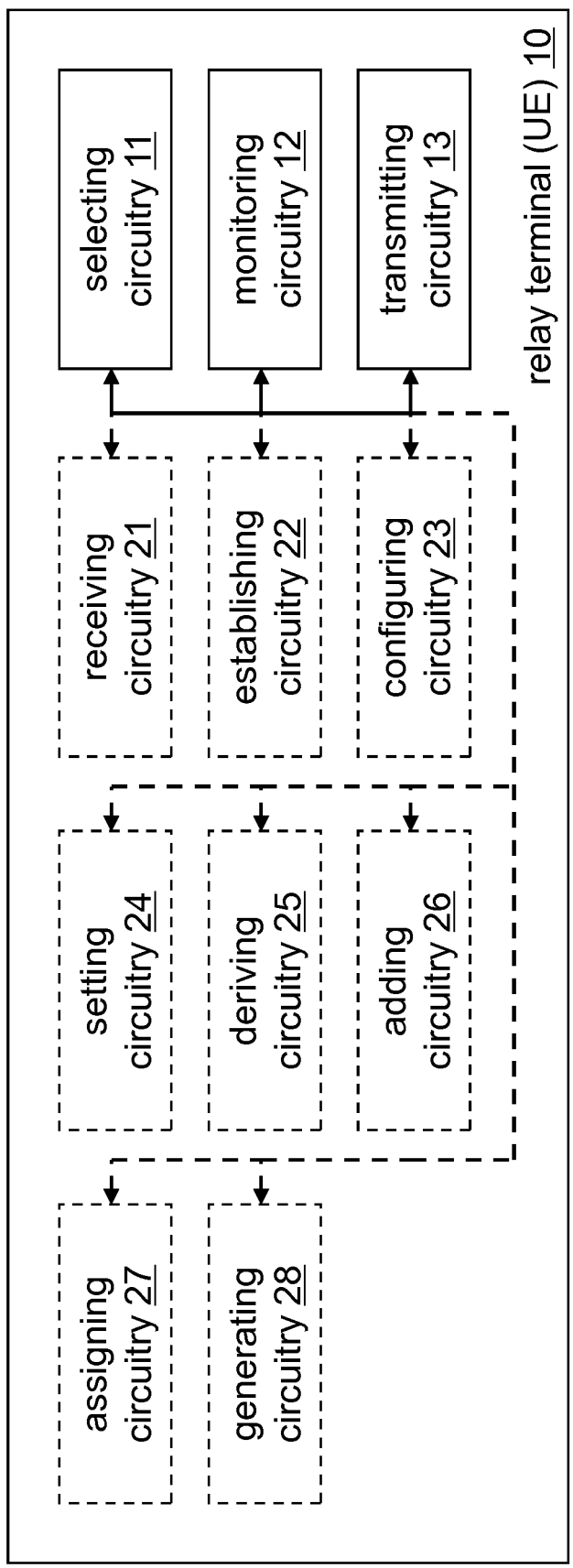
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a receiving circuitry 21, an establishing circuitry 22, a configuring circuitry 23, a setting circuitry 24, a deriving circuitry 25, an adding circuitry 26, an assigning circuitry 27, and/or a generating circuitry 28.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to exemplary embodiments of the present invention may comprise an operation of receiving delay information indicative of a maximum allowed delay for paging message forwarding towards terminals to be relayed, and an operation of establishing said set of configured sidelink communication groups based on said delay information.

According to a variation of the procedure shown in FIG. 7, exemplary details of the establishing operation are given, which are inherently independent from each other as such.

Such exemplary establishing operation according to exemplary embodiments of the present invention may comprise an operation of configuring, for each sidelink communication group of said set of configured sidelink communication groups, respective inter-terminal paging indicator resources based on said delay information.

Optionally, such exemplary establishing operation according to exemplary embodiments of the present invention may further comprise an operation of setting a validity period of said set of configured sidelink communication groups.

According to a variation of the procedure shown in FIG. 7, exemplary additional operations are given, which are inherently independent from each other as such. According to such variation, an exemplary method according to exemplary embodiments of the present invention may comprise an operation of transmitting information on said set of configured sidelink communication groups to said mobile access entity.

The transmitted set of configured sidelink communication groups may be (initially) configured sidelink communication groups, or may be updated sidelink communication groups updated e.g. after expiration of a validity period of said set of configured sidelink communication groups, or due to the setup or modification of a sidelink communication group.

According to a variation of the procedure shown in FIG. 7, exemplary additional operations are given, which are inherently independent from each other as such. According to such variation, an exemplary method according to exemplary embodiments of the present invention may comprise an operation of receiving, from said terminal to be relayed, terminal context information of said terminal to be relayed, and an operation of deriving said network-served paging indicator resources corresponding to said terminal to be relayed based on said terminal context information of said terminal to be relayed.

According to further exemplary embodiments of the present invention, said terminal context information of said terminal to be relayed comprises at least an identifier of said terminal to be relayed and a paging cycle configured for said terminal to be relayed.

According to further exemplary embodiments of the present invention, said selecting is based on said network-served paging indicator resources corresponding to said terminal to be relayed.

According to a variation of the procedure shown in FIG. 7, exemplary additional operations are given, which are inherently independent from each other as such.

According to such variation, an exemplary method according to exemplary embodiments of the present invention may comprise an operation of receiving, from a demanding terminal as a terminal to be relayed, a sidelink communication group establishment demand, an operation of establishing a demanded sidelink communication group based on said sidelink communication group establishment demand, and an operation of adding said demanded sidelink communication group to said set of configured sidelink communication groups.

Such exemplary establishing operation (establishing said demanded sidelink communication group) according to exemplary embodiments of the present invention may comprise an operation of configuring, for said demanded sidelink communication group, inter-terminal paging indicator resources based on demanding terminal related information included in said sidelink communication group establishment demand and on said delay information.

Such exemplary establishing operation (establishing said demanded sidelink communication group) according to exemplary embodiments of the present invention may optionally comprise an operation of setting a validity period of said demanded sidelink communication group.

As a preparation of the SL relaying, a device discovery procedure is performed, during which the potential relay terminal discovers potential terminals to be relayed. This device discovery procedure may be a PC5 discovery procedure.

Thus, according to exemplary embodiments of the present invention, the sidelink communication group establishment demand may be received via a discovery message or a discovery-related message or may be such discovery message or a discovery-related message. This holds true at least for the initial group establishment.

For the case of subsequent group re-establishments, the sidelink communication group establishment demand may be received via a dedicated message or may be such dedicated message.

According to a variation of the procedure shown in FIG. 7, exemplary additional operations are given, which are inherently independent from each other as such. According to such variation, an exemplary method according to exemplary embodiments of the present invention may comprise an operation of transmitting information on said demanded sidelink communication group to said mobile access entity.

According to a variation of the procedure shown in FIG. 7, exemplary details of the selecting operation (selecting, for said demanding terminal) are given, which are inherently independent from each other as such.

Such exemplary selecting operation (selecting, for said demanding terminal) according to exemplary embodiments of the present invention may comprise an operation of assigning said demanding terminal to said demanded sidelink communication group.

According to a variation of the procedure shown in FIG. 7, exemplary additional operations are given, which are inherently independent from each other as such. According to such variation, an exemplary method according to exemplary embodiments of the present invention may comprise an operation of transmitting, to said terminal to be relayed, information on said inter-terminal paging indicator resources configured for said sidelink communication group.

According to a variation of the procedure shown in FIG. 7, exemplary additional operations are given, which are inherently independent from each other as such. According to such variation, an exemplary method according to exemplary embodiments of the present invention may comprise an operation of generating, if said network-served paging related identifier indicative of said transmission of said network-served paging message is detected in said network-served paging indicator resources corresponding to said terminal to be relayed and said information indicative of paging of said terminal to be relayed is identified in said network-served paging message transmitted in said network-served paging message resources as a result of said monitoring, said inter-terminal paging message based on said information indicative of paging of said terminal to be relayed.

According to further exemplary embodiments of the present invention, said inter-terminal paging message comprises at least information on an identity of said terminal to be relayed.

According to further exemplary embodiments of the present invention, said inter-terminal paging message comprises at least purpose information indicative of a purpose of said inter-terminal paging message.

According to further exemplary embodiments of the present invention, if
- a first sidelink communication group of said set of configured sidelink communication groups is selected for a first terminal to be relayed and a second terminal to be relayed, and
- said network-served paging related identifier indicative of transmission of a first network-served paging message is detected in network-served paging indicator resources corresponding to said first terminal to be relayed as a result of said monitoring, and
- said network-served paging related identifier indicative of transmission of a second network-served paging message is detected in network-served paging indicator resources corresponding to said second terminal to be relayed as a result of said monitoring, and
- information indicative of paging of said first terminal to be relayed is identified in said first network-served paging message transmitted in first network-served paging message resources as a result of said monitoring, and
- information indicative of paging of said second terminal to be relayed is identified in said second network-served paging message transmitted in second network-served paging message resources as a result of said monitoring, said inter-terminal paging message comprises at least information on an identity of said first terminal to be relayed and information on an identity of said second terminal to be relayed.

According to further exemplary embodiments of the present invention, in such case, said inter-terminal paging message further comprises at least purpose information indicative of a purpose of said inter-terminal paging message in relation to said first terminal to be relayed and purpose information indicative of a purpose of said inter-terminal paging message in relation to said second terminal to be relayed.

According to a variation of the procedure shown in FIG. 7, exemplary additional operations are given, which are inherently independent from each other as such. According to such variation, an exemplary method according to exemplary embodiments of the present invention may comprise an operation of transmitting said inter-terminal paging message in said inter-terminal paging message resources for said transmission of said inter-terminal paging message.

According to a variation of the procedure shown in FIG. 7, exemplary additional operations are given, which are inherently independent from each other as such. According to such variation, an exemplary method according to exemplary embodiments of the present invention may comprise an operation of transmitting, before said inter-terminal paging indicator resources configured for said sidelink communication group and next to said network-served paging message resources including said information indicative of paging of said terminal to be relayed, an inter-terminal synchronization signal.

Figure 3:
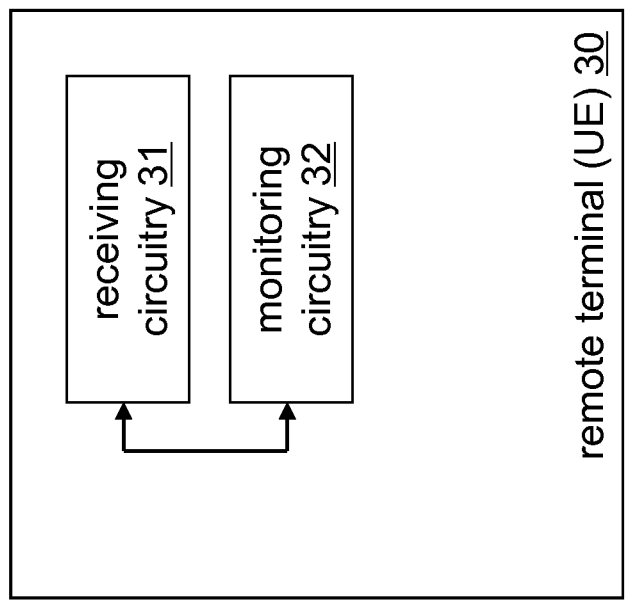
FIG. 3 is a block diagram illustrating an apparatus according to exemplary embodiments of the present invention.
Figure 8:
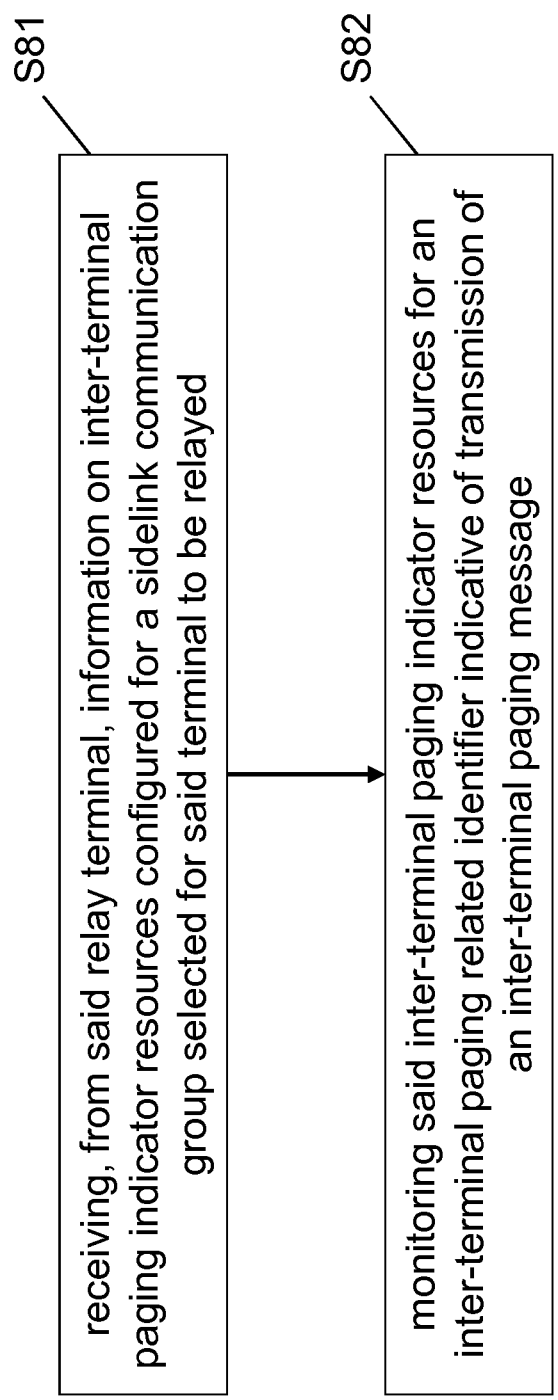
FIG. 8 is a schematic diagram of a procedure according to exemplary embodiments of the present invention.

FIG. 3 is a block diagram illustrating an apparatus according to exemplary embodiments of the present invention. The apparatus may be a terminal to be relayed (i.e., remote terminal, such as a UE) 30 by a relay terminal connected to a mobile access entity of a cellular network system and may comprise a receiving circuitry 31 and a monitoring circuitry 32. The receiving circuitry 31 receives, from said relay terminal, information on inter-terminal paging indicator resources configured for a sidelink communication group selected for said terminal to be relayed. The monitoring circuitry 32 monitors said inter-terminal paging indicator resources for an inter-terminal paging related identifier indicative of transmission of an inter-terminal paging message. FIG. 8 is a schematic diagram of a procedure according to exemplary embodiments of the present invention. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure (of a terminal to be relayed by a relay terminal connected to a mobile access entity of a cellular network system) according to exemplary embodiments of the present invention comprises an operation of receiving (S81), from said relay terminal, information on inter-terminal paging indicator resources configured for a sidelink communication group selected for said terminal to be relayed, and an operation of monitoring (S82) said inter-terminal paging indicator resources for an inter-terminal paging related identifier indicative of transmission of an inter-terminal paging message.

Figure 4:
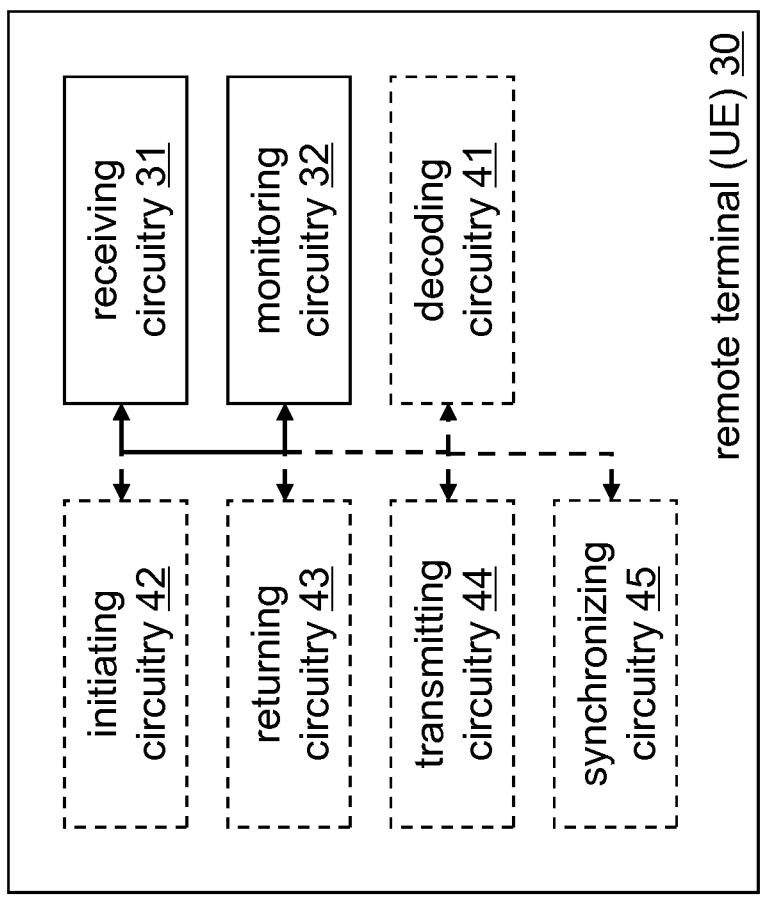
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a decoding circuitry 41, an initiating circuitry 42, a returning circuitry 43, a transmitting circuitry 44, and/or a synchronizing circuitry 45.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary additional operations are given, which are inherently independent from each other as such. According to such variation, an exemplary method according to exemplary embodiments of the present invention may comprise an operation of decoding, from said inter-terminal paging indicator resources, if said inter-terminal paging related identifier indicative of transmission of said inter-terminal paging message is detected in said inter-terminal paging indicator resources as a result of said monitoring, information on inter-terminal paging message resources for said transmission of said inter-terminal paging message.

According to a variation of the procedure shown in FIG. 8, exemplary additional operations are given, which are inherently independent from each other as such. According to such variation, an exemplary method according to exemplary embodiments of the present invention may comprise an operation of receiving said inter-terminal paging message in said inter-terminal paging message resources for said transmission of said inter-terminal paging message.

According to a variation of the procedure shown in FIG. 8, exemplary additional operations are given, which are inherently independent from each other as such. According to such variation, an exemplary method according to exemplary embodiments of the present invention may comprise an operation of initiating a response action to content of said inter-terminal paging message, if said inter-terminal paging message comprises information on an identity of said terminal to be relayed, and an operation of returning to a sleep state of said terminal to be relayed, if said inter-terminal paging message does not comprise information on said identity of said terminal to be relayed.

According to further exemplary embodiments of the present invention, said inter-terminal paging message comprises at least purpose information indicative of a purpose of said inter-terminal paging message.

According to further exemplary embodiments of the present invention, said response action is based on said purpose information.

According to a variation of the procedure shown in FIG. 8, exemplary additional operations are given, which are inherently independent from each other as such. According to such variation, an exemplary method according to exemplary embodiments of the present invention may comprise an operation of transmitting, to said relay terminal, terminal context information of said terminal to be relayed.

Further, according to such variation according to exemplary embodiments of the present invention, said sidelink communication group is selected for said terminal to be relayed based on said terminal context information of said terminal to be relayed.

According to further exemplary embodiments of the present invention, said terminal context information of said terminal to be relayed comprises at least an identifier of said terminal to be relayed and a paging cycle configured for said terminal to be relayed.

According to a variation of the procedure shown in FIG. 8, exemplary additional operations are given, which are inherently independent from each other as such. According to such variation, an exemplary method according to exemplary embodiments of the present invention may comprise an operation of transmitting, to said relay terminal, a sidelink communication group establishment demand.

Further, according to such variation according to exemplary embodiments of the present invention, a demanded sidelink communication group established based on said sidelink communication group establishment demand is selected for said terminal to be relayed.

As a preparation of the SL relaying, a device discovery procedure is performed, during which the potential relay terminal discovers potential terminals to be relayed. This device discovery procedure may be a PC5 discovery procedure.

Thus, according to exemplary embodiments of the present invention, the sidelink communication group establishment demand may be transmitted via a discovery message or a discovery-related message or may be such discovery message or a discovery-related message. This holds true at least for the initial group establishment.

For the case of subsequent group re-establishments, the sidelink communication group establishment demand may be transmitted via a dedicated message or may be such dedicated message.

According to a variation of the procedure shown in FIG. 8, exemplary additional operations are given, which are inherently independent from each other as such. According to such variation, an exemplary method according to exemplary embodiments of the present invention may comprise an operation of receiving, before said inter-terminal paging indicator resources configured for said sidelink communication group selected for said terminal to be relayed, an inter-terminal synchronization signal, and an operation of synchronizing with said relay terminal based on said inter-terminal synchronization signal.

Figure 5:
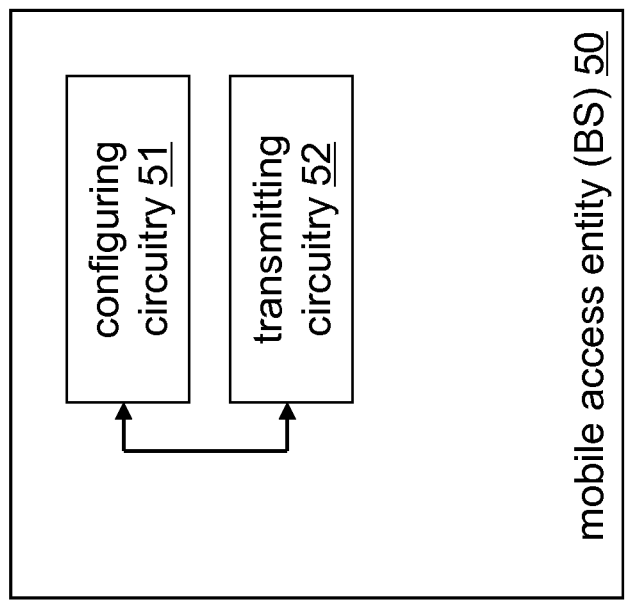
FIG. 5 is a block diagram illustrating an apparatus according to exemplary embodiments of the present invention.
Figure 9:
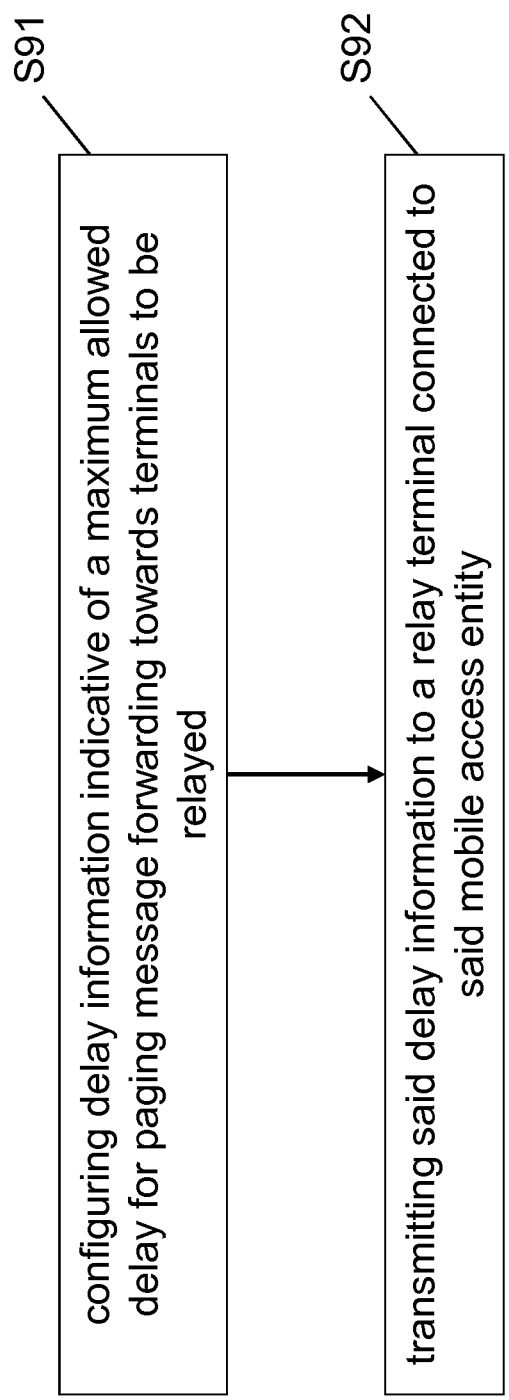
FIG. 9 is a schematic diagram of a procedure according to exemplary embodiments of the present invention.
Figure 10:
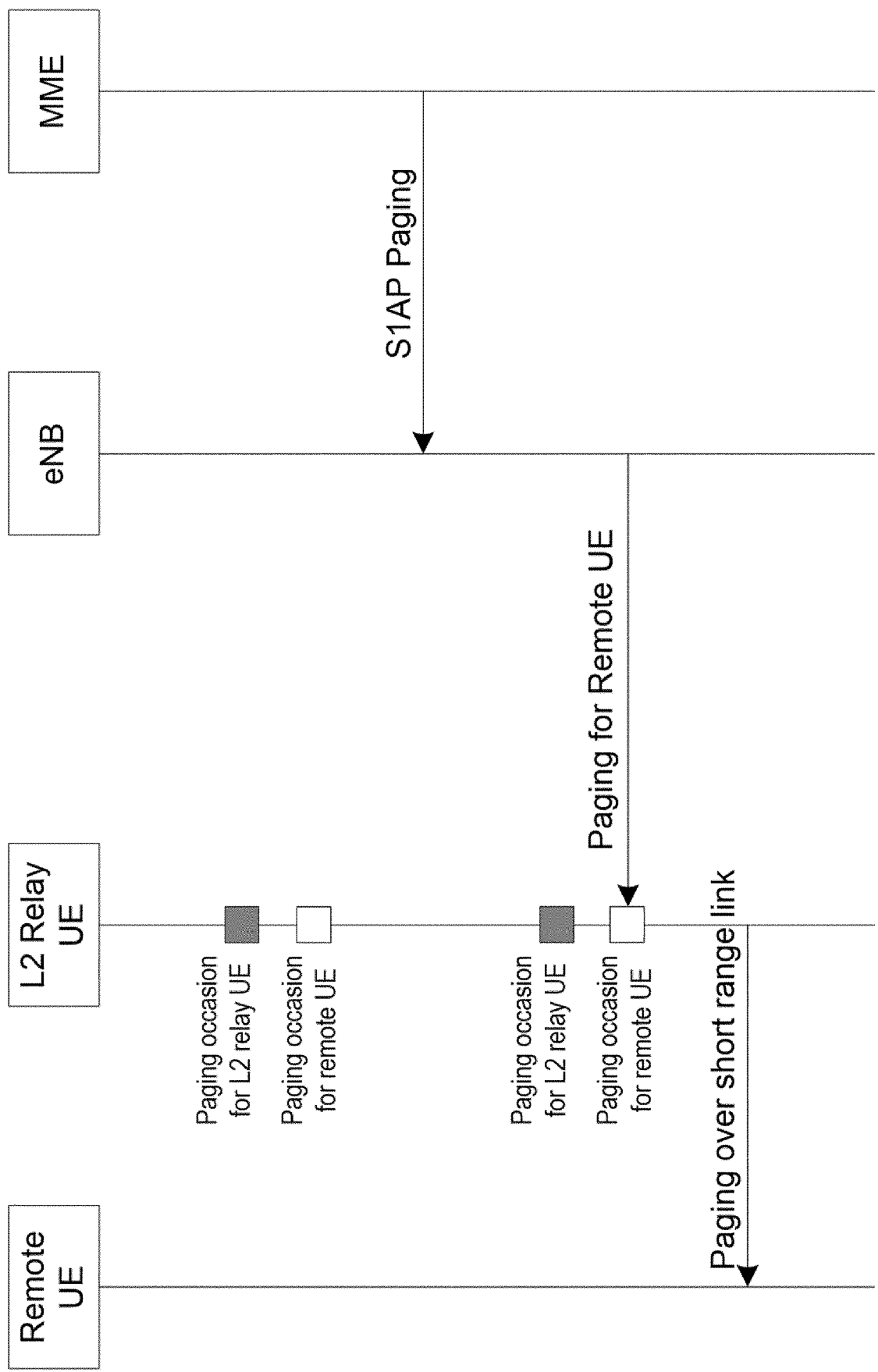
FIG. 10 shows a schematic diagram of an example of a system environment with signaling variants.

FIG. 5 is a block diagram illustrating an apparatus according to exemplary embodiments of the present invention. The apparatus may be a mobile access entity (i.e., access node, such as a base station (BS)) 50 of a cellular network system and may comprise a configuring circuitry 51 and a transmitting circuitry 52. The configuring circuitry 51 configures delay information indicative of a maximum allowed delay for paging message forwarding towards terminals to be relayed. The transmitting circuitry 52 transmits said delay information to a relay terminal connected to said mobile access entity. FIG. 9 is a schematic diagram of a procedure according to exemplary embodiments of the present invention. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure (of a mobile access entity of a cellular network system) according to exemplary embodiments of the present invention comprises an operation of configuring (S91) delay information indicative of a maximum allowed delay for paging message forwarding towards terminals to be relayed, and an operation of transmitting (S92) said delay information to a relay terminal connected to said mobile access entity.

Figure 6:
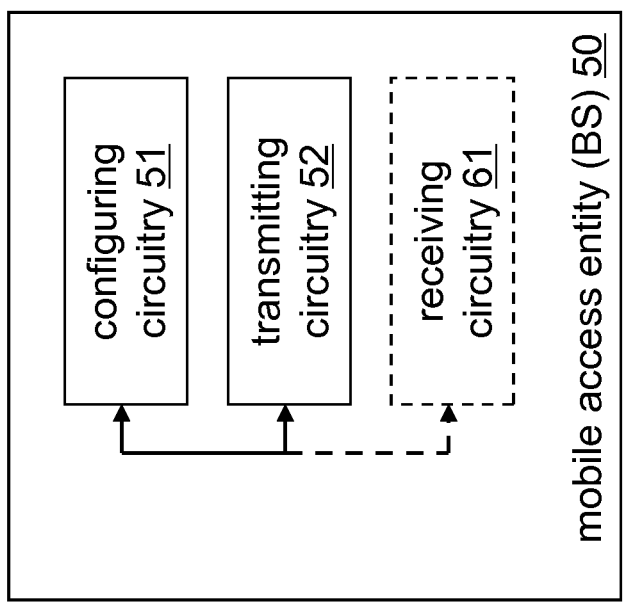
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a receiving circuitry 61.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations are given, which are inherently independent from each other as such. According to such variation, an exemplary method according to exemplary embodiments of the present invention may comprise an operation of receiving, from said relay terminal, information on a set of configured sidelink communication groups established based on said delay information.

The received set of configured sidelink communication groups may be (initially) configured sidelink communication groups, or may be updated sidelink communication groups updated e.g. after expiration of a validity period of said set of configured sidelink communication groups, or due to the setup or modification of a sidelink communication group.

According to further exemplary embodiments of the present invention, said information on said set of configured sidelink communication groups is indicative of inter-terminal paging indicator resources respectively configured based on said delay information.

According to further exemplary embodiments of the present invention, said information on said set of configured sidelink communication groups is indicative of a validity period of said set of configured sidelink communication groups.

According to a variation of the procedure shown in FIG. 9, exemplary additional operations are given, which are inherently independent from each other as such. According to such variation, an exemplary method according to exemplary embodiments of the present invention may comprise an operation of receiving, from said relay terminal, information on a demanded sidelink communication group established based on a sidelink communication group establishment demand from a demanding terminal as a terminal to be relayed and on said delay information.

Further, according to such variation according to exemplary embodiments of the present invention, said information on said demanded sidelink communication group may be indicative of inter-terminal paging indicator resources configured based on demanding terminal related information included in said sidelink communication group establishment demand and on said delay information.

Further, according to such variation according to exemplary embodiments of the present invention, said information on said demanded sidelink communication group may be indicative of a validity period of said information on said demanded sidelink communication group.

Figure 12:
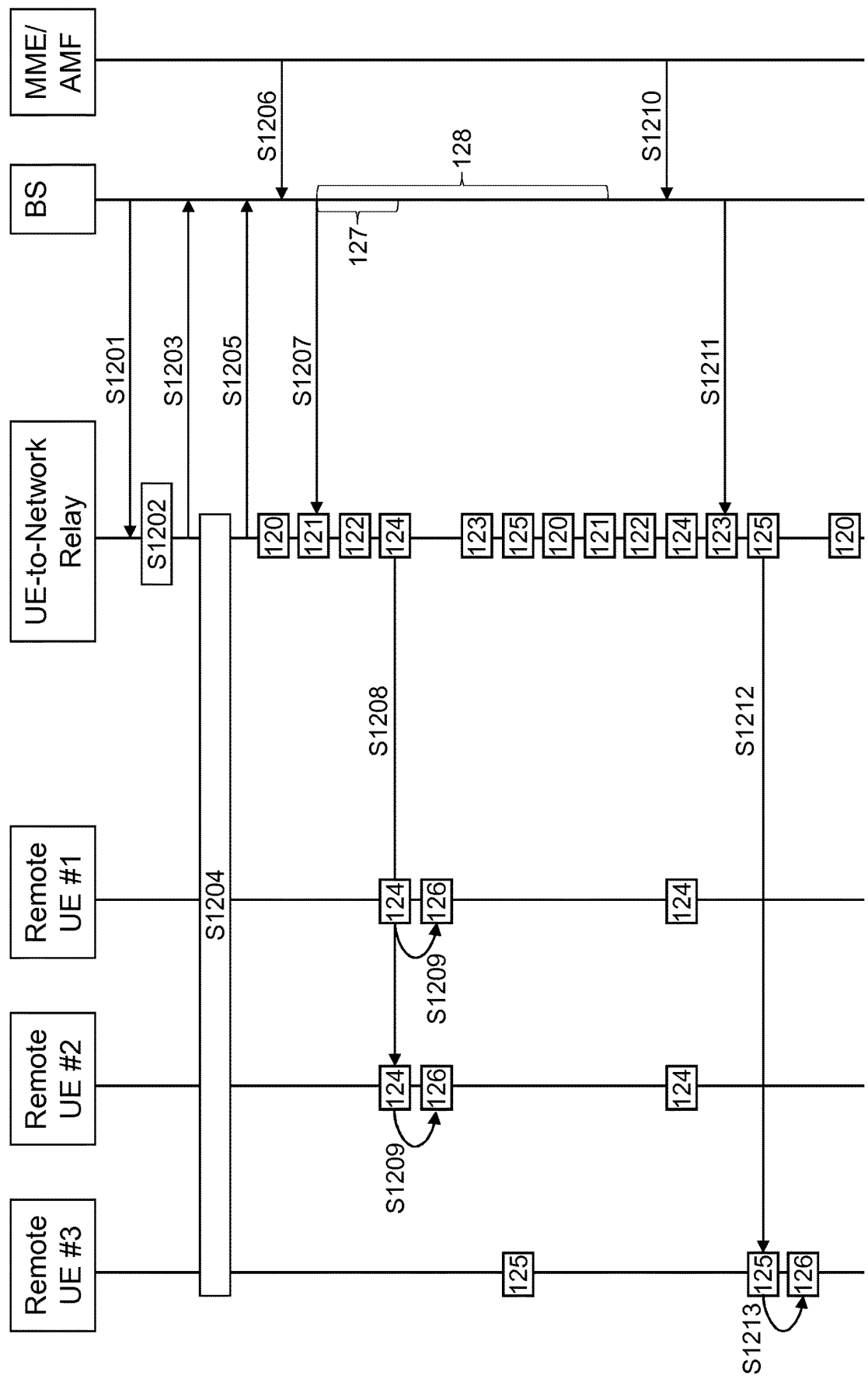
FIG. 12 shows a schematic diagram of an example of a system environment with signaling variants according to exemplary embodiments of the present invention.
Figure 13:
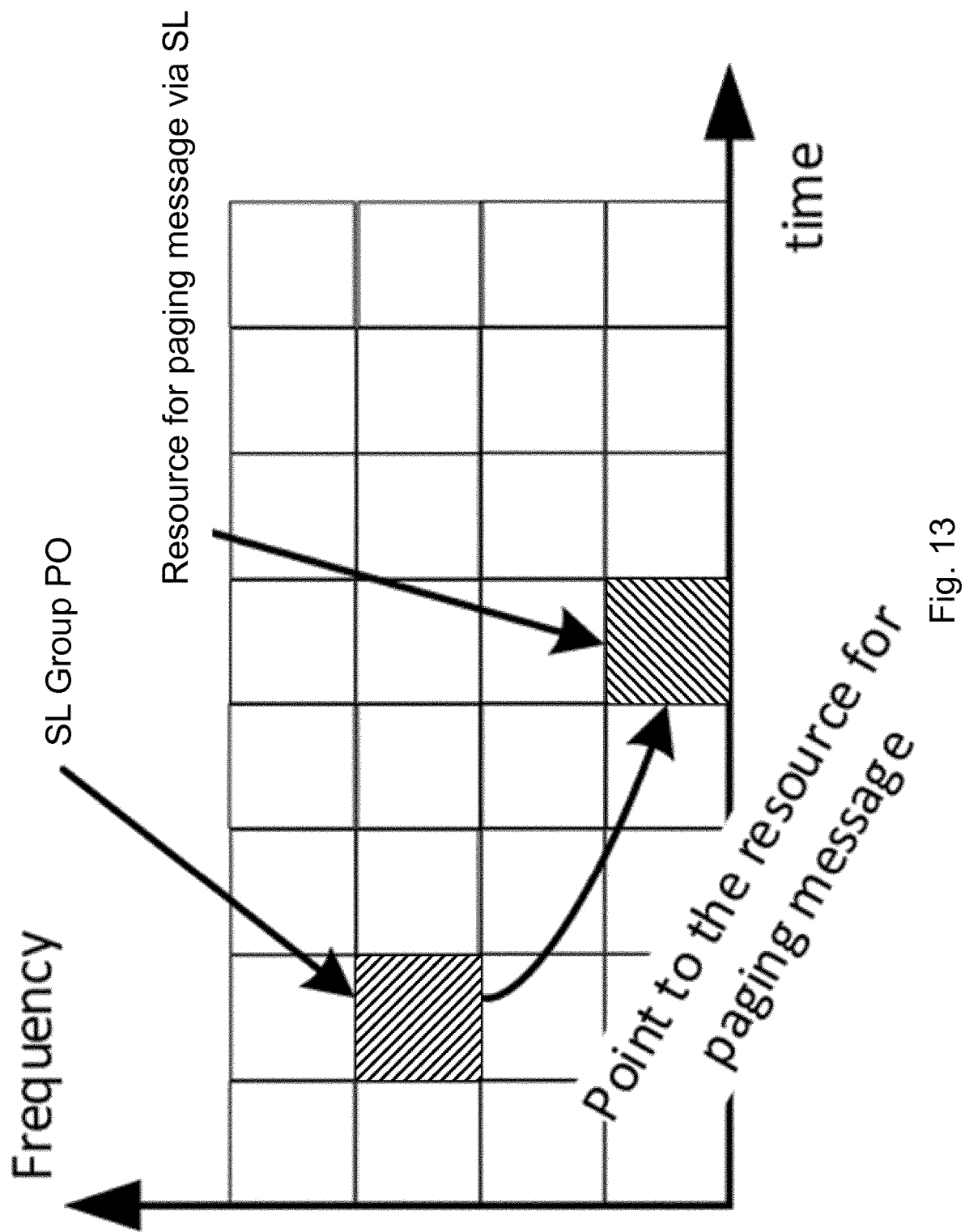
FIG. 13 is a schematic diagram illustrating the arrangement of resources including a paging message and resources including a specification of the resources including the paging message.

Exemplary embodiments of the present invention are described in more specific terms based on FIGS. 12 and 13.

FIG. 12 shows a schematic diagram of an example of a system environment with signaling variants according to exemplary embodiments of the present invention.

FIG. 12 particularly illustrates signaling between a management entity, a BS (as an example for a mobile access entity of a cellular network system), a UE-to-Network relay (as an example for a relay terminal connected to a mobile access entity of a cellular network system), and three remote UEs (remote UE #1, remote UE #2, remote UE #3 as examples for a respective terminal to be relayed by a relay terminal (i.e., UE-to-Network relay) connected to a mobile access entity of a cellular network system).

The management entity may be a mobility management entity (MME) or an access and mobility management function (AMF). In 4G networks, the management entity is a MME. In 5G networks, the management entity is an AMF. In exemplary embodiments of the present invention applied to networks or network compounds other than 4G or 5G, entities different from MME of AMF may serve as the management entity shown in FIG. 12.

Here, 120 denotes POs for the relay terminal (UE-to-Network relay). Further, 121 denotes POs for the remote UE #1. Further, 122 denotes POs for the remote UE #2. Further, 123 denotes POs for the remote UE #3. It is again noted that POs (paging occasion, i.e., network-served paging indicator resources) denote the time occasion for a UE to wake up and monitor the PDCCH in the cellular downlink.

Further, 124 denotes SL Group POs #1, i.e, SL Group POs for SL Group #1. Further, 125 denotes SL Group POs #2, i.e, SL Group POs for SL Group #2. It is again noted that SL Group POs (sidelink group paging occasion, i.e., sidelink group paging resources, i.e., inter-terminal paging indicator resources) denote the time occasion for a remote UE to wake up and monitor the SL in order to check if there is an upcoming paging message.

As is derivable from FIG. 12, remote UE #1 and remote UE #2 are assigned to SL Group #1 (i.e. SL Group POs #1), while remote UE #3 is assigned to SL Group #2 (i.e. SL Group POs #2). 126 denotes resources (i.e. frequency-time-resources) of a SL paging message.

In step S1201, the network configures a parameter e.g. denoted as maxPaging Delay indicating the maximal allowed delay for a paging message to be forwarded by the UE-to-Network relay via the SL. This parameter can be sent either through the system information block (SIB) or through the downlink control information (DCI) or through dedicated radio resource control (RRC) signaling. With a larger value for maxPagingDelay, a larger time interval between two consecutive SL Group POs can be used. Therefore, the UE-to-Network relay can assign less SL Group POs and aggregate more paging messages before each SL Group PO. In this way, the energy consumption at the UE-to-Network relay can be reduced. However, the delay for forwarding the paging messages will be increased, and it needs to be taken account by the BS when it sets the value for maxPagingDelay.

In step S1202, based on the maxPagingDelay, the UE-to-Network relay can configure the SL Group POs and their validity period (e.g. $T_{sIGP}$). Here, it is noted that the SL Group POs will be periodically repeated until the validity period (e.g. $T_{sIGP}$) expires. After that, the UE-to-Network relay needs to re-configure/re-establish the SL Group POs and the new validity period (e.g. $T_{sIGP}$) correspondingly.

The SL Group POs indicate a set of time-and-frequency occasions (i.e., frame numbers and their associated subframe numbers and, optionally, also the frequency location) when the UE-to-Network Relay transmits the SL-P-RNTI and the resource allocation information for the paging message via the SL. According to exemplary embodiments of the present invention, the configured resource pool or the dedicated resources for sidelink communication are considered by the UE-to-Network relay to derive the SL Group POs in order to avoid the SL-R-RNTI and the resource allocation information for the paging message via the SL being transmitted over a time-and-frequency resource that is not configured for SL communication.

In step S1203, the configuration information for SL Group POs and the validity period (e.g. $T_{sIGP}$) will be transmitted from the UE-to-Network relay to the BS. In this way, the BS can be aware of the time when the UE-to-Network relay performs the paging-related transmission via the SL, in order to avoid a collision between the SL transmission and a cellular link transmission (i.e., uplink and downlink).

In step S1204, a (PC5) discovery procedure is conducted. With the PC5 discovery procedure, a remote UE and a UE-to-Network relay can set up a sidelink connection. In addition, during this procedure, the remote UE can send its UE context information to the UE-to-Network relay, e.g., its 5G-S-TMSI, I-RNTI, and its paging cycle T. With this information, the UE-to-Network relay can derive the POs of that remote UE. Following that, the UE-to-Network relay selects an appropriate SL Group PO and transmits the corresponding configuration information to the remote UE. For instance, the UE-to-Network relay may select the next SL Group PO, which directly and closely follows the PO of the remote UE from cellular downlink. In case none of the existing SL Group POs is appropriate (e.g. due to a large delay), the UE-to-Network relay can add or establish a new SL Group PO. In this case, the UE-to-Network relay selects the new SL Group PO and transmits the corresponding configuration information to the remote UE. After adding a new SL Group PO, the UE-to-Network relay may report that information to the BS. Thus, instead of monitoring the POs in cellular downlink, the remote UE only needs to monitor the assigned SL Group PO periodically and check if there is an upcoming paging message for itself.

Here, it is noted that more than one remote UEs (here e.g. remote UEs #1 and #2) can be assigned to the same SL Group (i.e., SL Group POs).

In step S1205, after a successful PC5 discovery, the UE-to-Network relay sends the discovery report to its serving BS, and then the BS can know the associated relationship between the UE-to-Network relay and the remote UE.

From then on, the UE-to-Network relay will monitor its own PO (120) and the POs (121, 122, 123) of its linked remote UEs in PDCCH between any two consecutive SL Group POs (e.g., between the SL Group PO (n) and the SL Group PO (n+1) of the same SL Group), or more general, to the next SL Group PO of the same SL Group.

In step S1206, the MME or AMF (or in general, management entity) initiates an S1AP paging for the remote UE #1.

In step S1207, the BS transmits paging for the remote UE #1 within a PO 121 of remote UE #1.

If there is a paging message of a remote UE in cellular downlink, the UE-to-Network relay determines which remote UE the paging message is for.

If the UE-to-Network relay finds that at least one of its linked remote UEs is paged, it transmits the SLSS before the corresponding SL Group PO (e.g., the SL Group PO (n+1)), in order to assist the remote UE(s) to be synchronized. Following that, it sends the SL-P-RNTI at the corresponding SL Group PO.

According to exemplary embodiments of the present invention, the SL-P-RNTI is a fixed value. It indicates that there will be a paging message transmitted in the SL, and the monitoring remote UE(s) should proceed to read the paging message to check if its identity is included there. In addition to the SL-P-RNTI, the resource information for the paging message is also transmitted in this PO, and it points to the time-and-frequency resource for the remote UE to find the paging message.

This pointing to the time-and-frequency resource for the remote UE to find the paging message is shown in FIG. 13. FIG. 13 is a schematic diagram illustrating the arrangement of resources including a paging message and resources including a specification of the resources including the paging message and in particular shows that the content transmitted at an SL Group PO includes the SL-P-RNTI and the resource allocation information of the paging message in the SL.

In that time-and-frequency resource, the paging message generated by the UE-to-Network relay is carried. In detail, the paging message contains the identity/identities of the paged remote UE(s) and other information elements indicative of the purpose of the paging message, such as system information modification, and Earthquake & Tsunami Warning System (ETWS) indication.

If none of its linked remote UEs is paged, the UE-to-Network relay will not transmit SLSS and the SL-P-RNTI in the corresponding SL Group PO.

As, in step S1207, paging for the remote UE #1 is received within a PO 121 of remote UE #1, in step S1208, the UE-to-Network relay sends, in a subsequent SL Group PO #1, an SL-P-RNTI and the above-mentioned resource allocation information of the paging message in the SL.

Subsequently, in the indicated resources 126 according to the resource allocation information of the paging message in the SL, the SL paging message (for remote UE #1) is transmitted.

The remote UE wakes up before its assigned SL Group PO and synchronizes to the UE-to-Network relay by receiving the SLSS. Afterwards, it monitors the assigned SL Group PO to search for the SL-P-RNTI from the SL.

If the SL-P-RNTI is found, as in the present case by remote UE #1 and remote UE #2, in step S1209, the remote UE (in the present case remote UE #1 and remote UE #2) proceeds to decode the resource allocation information of the paging message sent over the SL. With that information, it reads the paging message to check whether its identity is included in the paging message or not.

If its identity is included in the paging message (as in the present case for remote UE #1 but not for remote UE #2), the remote UE reads the content of the paging message to take the corresponding action, e.g., sending random access (RA) preamble or acquiring the required system information.

If its identity is not included in the paging message (as in the present case for remote UE #2), the Remote UE returns to sleep.

If the SL-P-RNTI is not found (as e.g. for remote UEs #1 and #2 in the second occurence of SL Group PO #1 (124), where the UE-to-Network Relay does not send such SL-P-RNTI in the lack of paging messages for remote UEs #1 and #2, and e.g. for remote UE #3 in the first occurence of SL Group PO #2 (125), where the UE-to-Network Relay does not send such SL-P-RNTI in the lack of paging messages for remote UE #3), the remote UE returns to sleep.

Similar thereto, in step S1210, the MME or AMF (or in general, management entity) initiates an S1AP paging for the remote UE #3.

In step S1211, the BS transmits paging for the remote UE #3 within a PO 123 of remote UE #3.

In step S1212, the UE-to-Network relay sends, in a subsequent SL Group PO #2, an SL-P-RNTI and the above-mentioned resource allocation information of the paging message in the SL.

Subsequently, in the indicated resources 126 according to the resource allocation information of the paging message in the SL, the SL paging message (for UE #3) is transmitted.

The remote UE #3 wakes up before its assigned SL Group PO and synchronizes to the UE-to-Network relay by receiving the SLSS. Afterwards, it monitors the assigned SL Group PO #2 (125) to search for the SL-P-RNTI from the SL.

If the SL-P-RNTI is found, as in the present case by UE #3, in step S1213, the remote UE #3 proceeds to decode the resource allocation information of the paging message sent over the SL. With that information, it reads the paging message to check whether its identity is included in the paging message or not.

If its identity is included in the paging message, the remote UE #3 reads the content of the paging message to take the corresponding action, e.g., sending random access (RA) preamble or acquiring the required system information.

If its identity is not included in the paging message, the remote UE #3 returns to sleep.

Figure 11:
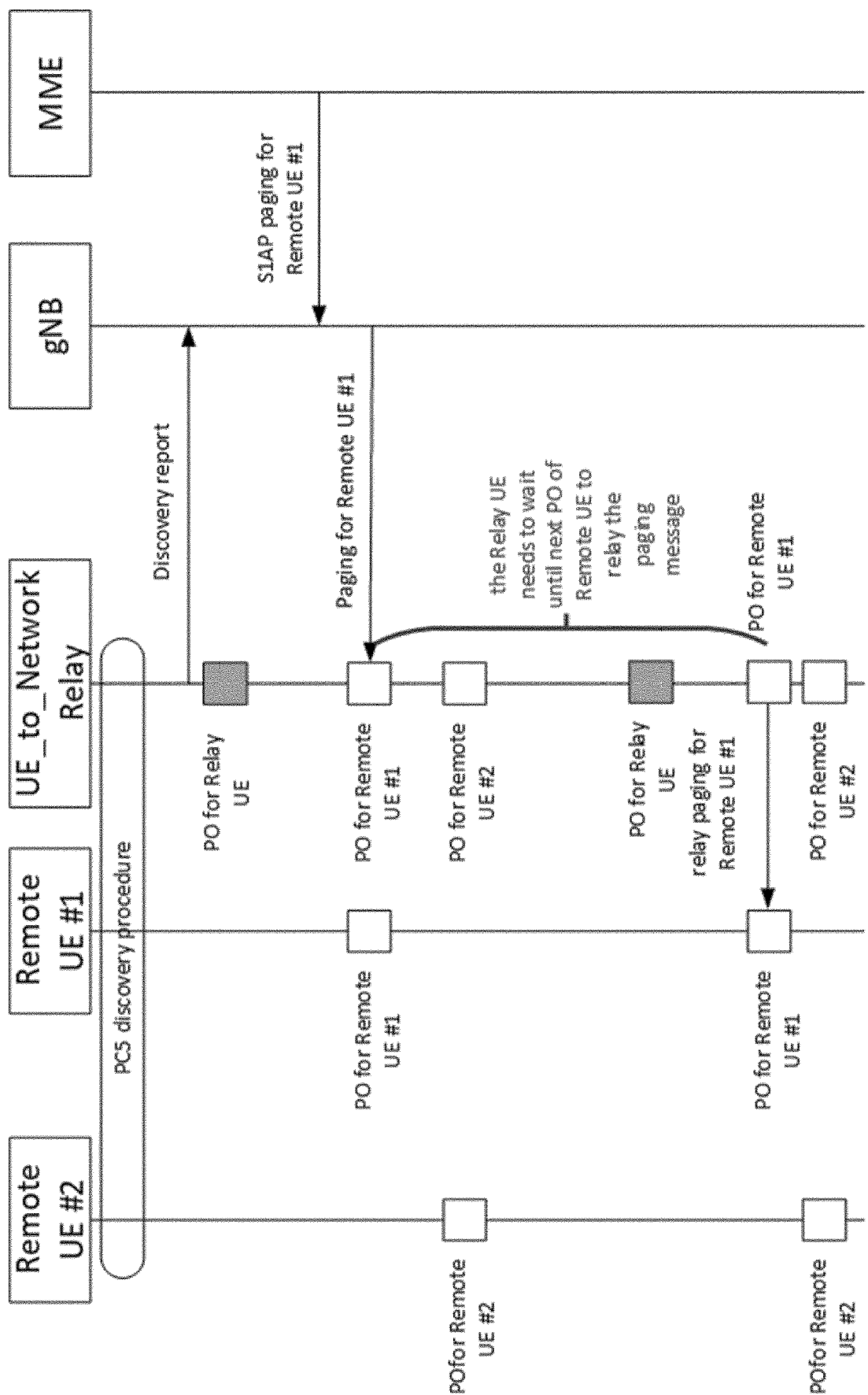
FIG. 11 shows a schematic diagram of an example of a system environment with signaling variants.

Comparing FIGS. 11 and 12, it is derivable that the delay for forwarding a paging message to a specific remote UE (here remote UE #1) without application of the principles of the present invention corresponds to the curly bracket 128.

In contrast thereto, the delay for forwarding a paging message to a specific remote UE (here remote UE #1) when applying exemplary embodiments of the present invention corresponds to the curly bracket 127 and is thus much shorter than that when not applying principles of the present invention.

Namely, according to exemplary embodiments of the present invention, if the UE-to-Network relay receives a paging message for one linked remote UE from the BS, it does not need to wait until the next PO of that remote UE to forward the paging message. Instead, it can use the following SL Group PO (assigned to that remote UE) to send the SL-P-RNTI and forward the paging message. Thus, the delay to forward a paging message can be reduced.

Further, according to exemplary embodiments of the present invention, the UE-to-Network relay may extract the paging information relevant for its own linked remote UEs from multiple received paging messages between two consecutive SL Group POs (of the same SL Group). The extracted paging information from multiple paging messages may be used to generate a new paging message. In this way, the downlink paging messages distributed in the time domain can be concentrated and, therefore, the SLSS only needs to be transmitted before each SL Group PO. Thus, the amount of SLSS transmissions and the energy consumption at the UE-to-Network relay can be reduced.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 14:
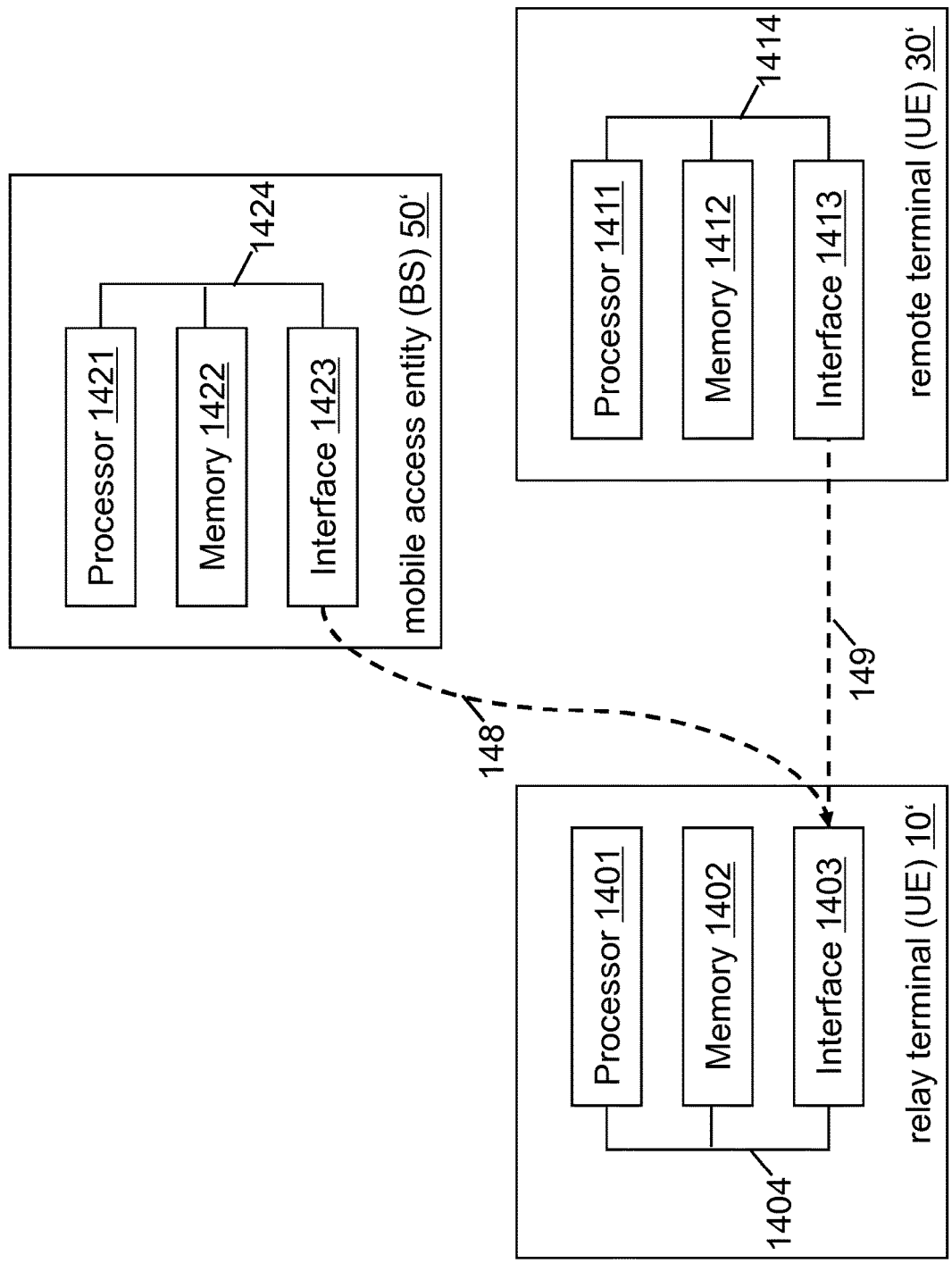
FIG. 14 is a block diagram alternatively illustrating apparatuses according to exemplary embodiments of the present invention.

In FIG. 14, an alternative illustration of apparatuses according to exemplary embodiments of the present invention is depicted. As indicated in FIG. 14, according to exemplary embodiments of the present invention, the apparatus (relay terminal) 10' (corresponding to the relay terminal 10) comprises a processor 1401, a memory 1402 and an interface 1403, which are connected by a bus 1404 or the like. Further, according to exemplary embodiments of the present invention, the apparatus (remote terminal) 30' (corresponding to the remote terminal 30) comprises a processor 1411, a memory 1412 and an interface 1413, which are connected by a bus 1414 or the like. Further, according to exemplary embodiments of the present invention, the apparatus (mobile access entity) 50' (corresponding to the mobile access entity 50) comprises a processor 1421, a memory 1422 and an interface 1423, which are connected by a bus 1424 or the like, and the apparatuses may be connected via links 148, 149, respectively.

The link 148 between a mobile access entity (e.g. BS 50') and a terminal (e.g. UE 10') can use a different radio technology or a different air interface than the link 149 between two terminals, e.g. terminals (UEs) 10' and 30'.

The processor 1401/1411/1421 and/or the interface 1403/1413/1423 may also include a modem or the like to facilitate communication over a (hardwire or wireless) link, respectively. The interface 1403/1413/1423 may include a suitable transceiver coupled to one or more antennas or communication means for (hardwire or wireless) communications with the linked or connected device(s), respectively. The interface 1403/1413/1423 is generally configured to communicate with at least one other apparatus, i.e. the interface thereof.

The memory 1402/1412/1422 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the relay terminal 10 comprises at least one processor 1401, at least one memory 1402 including computer program code, and at least one interface 1403 configured for communication with at least another apparatus. The processor (i.e. the at least one processor 1401, with the at least one memory 1402 and the computer program code) is configured to perform selecting, for a terminal to be relayed, a sidelink communication group of a set of configured sidelink communication groups (thus the apparatus comprising corresponding means for selecting), to perform monitoring network-served paging indicator resources corresponding to said terminal to be relayed for a network-served paging related identifier indicative of transmission of a network-served paging message and information on network-served paging message resources for said transmission of said network-served paging message (thus the apparatus comprising corresponding means for monitoring), and to perform transmitting, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message (thus the apparatus comprising corresponding means for transmitting).

According to further exemplary embodiments of the present invention, an apparatus representing the remote terminal 30 comprises at least one processor 1411, at least one memory 1412 including computer program code, and at least one interface 1413 configured for communication with at least another apparatus. The processor (i.e. the at least one processor 1411, with the at least one memory 1412 and the computer program code) is configured to perform receiving, from said relay terminal, information on inter-terminal paging indicator resources configured for a sidelink communication group selected for said terminal to be relayed (thus the apparatus comprising corresponding means for receiving), and to perform monitoring said inter-terminal paging indicator resources for an inter-terminal paging related identifier indicative of transmission of an inter-terminal paging message (thus the apparatus comprising corresponding means for monitoring).

According to further exemplary embodiments of the present invention, an apparatus representing the mobile access entity 50 comprises at least one processor 1421, at least one memory 1422 including computer program code, and at least one interface 1423 configured for communication with at least another apparatus. The processor (i.e. the at least one processor 1421, with the at least one memory 1422 and the computer program code) is configured to perform configuring delay information indicative of a maximum allowed delay for paging message forwarding towards terminals to be relayed (thus the apparatus comprising corresponding means for configuring), and to perform transmitting said delay information to a relay terminal connected to said mobile access entity (thus the apparatus comprising corresponding means for transmitting).

For further details regarding the operability/functionality of the individual apparatuses, reference is made to the above description in connection with any one of FIGS. 1 to 13, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for handling of paging messages in communication endpoint to network relaying scenarios. Such measures exemplarily comprise, at a relay terminal connected to a mobile access entity of a cellular network systems, selecting, for a terminal to be relayed, a sidelink communication group of a set of configured sidelink communication groups, monitoring network-served paging indicator resources corresponding to said terminal to be relayed for a network-served paging related identifier indicative of transmission of a network-served paging message and information on network-served paging message resources for said transmission of said network-served paging message, transmitting, if said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message, and transmitting said inter-terminal paging message in said inter-terminal paging message resources for said transmission of said inter-terminal paging message.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
5G-S-TMSI 5G-serving temporary mobile subscriber identifier
AMF access and mobility management function
BS base station
CN core network
D2D Device-to-Device
DCI downlink control information
DRX discontinuous reception
eNB evolved NodeB
ETWS Earthquake & Tsunami Warning System
IoT Internet-of-Things
I-RNTI RRC_Inactive-radio network temporary identifier
LTE Long Term Evolution
MIB master information block
MME mobility management entity
PDCCH Physical Downlink Control Channel
PDSCH physical downlink shared channel
PO paging occasion
P-RNTI paging-radio network temporary identifier
ProSe proximity-service
RA random access
RAN radio access network
RN relay node
RRC radio resource control
SIB system information block
SIB1 system information block 1
SIB2 system information block 2
SL sidelink
SL-P-RNTI sidelink-paging-radio network temporary identifier
SLSS SL synchronization signal
TR technical report
TS technical specification
UE user equipment
V2X vehicle-to-everything

The invention claimed is:

1. A method of a relay terminal connected to a mobile access entity of a cellular network system, the method comprising:
   selecting, for a terminal to be relayed, a sidelink communication group of a set of configured sidelink communication groups;
   monitoring network-served paging indicator resources corresponding to said terminal to be relayed for a network-served paging related identifier indicative of transmission of a network-served paging message and information on network-served paging message resources for said transmission of said network-served paging message;
   transmitting, based on determining said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message
   receiving delay information indicative of a maximum allowed delay for paging message forwarding towards terminals to be relayed, and establishing circuitry configured to established said set of configured sidelink communication groups based on said delay information; and
   receiving, from a demanding terminal as a terminal to be relayed, a sidelink communication group establishment demand;
   establishing a demanded sidelink communication group based on said sidelink communication group establishment demand; and
   adding said demanded sidelink communication group to said set of configured sidelink communication groups.

2. An apparatus of a relay terminal connected to a mobile access entity of a cellular network system, the apparatus comprising:
   selecting circuitry configured to select, for a terminal to be relayed, a sidelink communication group of a set of configured sidelink communication groups;
   monitoring circuitry configured to monitor network-served paging indicator resources corresponding to said terminal to be relayed for a network-served paging related identifier indicative of transmission of a network-served paging message and information on network-served paging message resources for said transmission of said network-served paging message;
   transmitting circuitry configured to transmit, based on determining said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring circuitry, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message;

receiving circuitry configured to receive delay information indicative of a maximum allowed delay for paging message forwarding towards terminals to be relayed, and establishing circuitry configured to established said set of configured sidelink communication groups based on said delay information;

receiving circuitry configured to receive, from a demanding terminal as a terminal to be relayed, a sidelink communication group establishment demand;

establishing circuitry configured to establish a demanded sidelink communication group based on said sidelink communication group establishment demand; and adding circuitry configured to add said demanded sidelink communication group to said set of configured sidelink communication groups.

3. The apparatus according to claim 2, further comprising configuring circuitry configured to configure, for each sidelink communication group of said set of configured sidelink communication groups, respective inter-terminal paging indicator resources based on said delay information, and optionally setting circuitry configured to set a validity period of said set of configured sidelink communication groups.

4. The apparatus according to claim 2, further comprising transmitting circuitry configured to transmit information on said set of configured sidelink communication groups to said mobile access entity.

5. The apparatus according to claim 2, further comprising receiving circuitry configured to receive, from said terminal to be relayed, terminal context information of said terminal to be relayed, and deriving circuitry configured to derive said network-served paging indicator resources corresponding to said terminal to be relayed based on said terminal context information of said terminal to be relayed.

6. The apparatus according to claim 5, wherein said terminal context information of said terminal to be relayed comprises at least an identifier of said terminal to be relayed and a paging cycle configured for said terminal to be relayed.

7. The apparatus according to claim 5, wherein a selection by said selecting circuitry is based on said network-served paging indicator resources corresponding to said terminal to be relayed.

8. The apparatus according to claim 2, further comprising configuring circuitry configured to, in relation to an establishment of said demanded sidelink communication group by said establishing circuitry, configure, for said demanded sidelink communication group, inter-terminal paging indicator resources based on demanding terminal related information included in said sidelink communication group establishment demand and on said delay information; and setting circuitry configured to, in relation to an establishment of said demanded sidelink communication group by said establishing circuitry, set a validity period of said demanded sidelink communication group.

9. The apparatus according to claim 8, further comprising transmitting circuitry configured to transmit information on said demanded sidelink communication group to said mobile access entity.

10. The apparatus according to claim 8, further comprising assigning circuitry configured to, in relation to a selection by said selecting circuitry for said demanding terminal, assign said demanding terminal to said demanded sidelink communication group.

11. The apparatus according to claim 2, further comprising transmitting circuitry configured to transmit, to said terminal to be relayed, information on said inter-terminal paging indicator resources configured for said sidelink communication group.

12. An system comprising:
an apparatus of a terminal to be relayed by a relay terminal connected to a mobile access entity of a cellular network system, the apparatus comprising:
a processor; and
a non-transitory computer-readable media comprising computer-executable instructions that, when executed by the processor, cause the processor to perform the following operations:
selecting, for a terminal to be relayed, a sidelink communication group of a set of configured sidelink communication groups;
monitoring network-served paging indicator resources corresponding to said terminal to be relayed for a network-served paging related identifier indicative of transmission of a network-served paging message and information on network-served paging message resources for said transmission of said network-served paging message;
transmitting, based on said network-served paging related identifier indicative of transmission of said network-served paging message is detected in said network-served paging indicator resources corresponding to said terminal to be relayed and information indicative of paging of said terminal to be relayed is identified in said network-served paging message transmitted in said network-served paging message resources as a result of said monitoring, in inter-terminal paging indicator resources configured for said sidelink communication group and next to said network-served paging message resources including said information indicative of paging of said terminal to be relayed, an inter-terminal paging related identifier indicative of transmission of an inter-terminal paging message and information on inter-terminal paging message resources for said transmission of an said inter-terminal paging message;
receiving delay information indicative of a maximum allowed delay for paging message forwarding towards terminals to be relayed, and establishing circuitry configured to established said set of configured sidelink communication groups based on said delay information;
receiving, from a demanding terminal as a terminal to be relayed, a sidelink communication group establishment demand;
establishing a demanded sidelink communication group based on said sidelink communication group establishment demand; and
adding said demanded sidelink communication group to said set of configured sidelink communication groups.

13. The system according to claim 12, wherein the apparatus further comprises decoding circuitry configured to decode, from said inter-terminal paging indicator resources, if said inter-terminal paging related identifier indicative of transmission of said inter-terminal paging message is detected in said inter-terminal paging indicator resources as a result of said monitoring, information on inter-terminal paging message resources for said transmission of said inter-terminal paging message.

14. The system according to claim 13, wherein the apparatus further comprises receiving circuitry configured to receive said inter-terminal paging message in said inter-terminal paging message resources for said transmission of said inter-terminal paging message.

15. The system according to claim 14, wherein the apparatus further comprises initiating circuitry configured to initiate a response action to content of said inter-terminal paging message, if said inter-terminal paging message comprises information on an identity of said terminal to be relayed, and returning circuitry configured to return to a sleep state of said terminal to be relayed, if said inter-terminal paging message does not comprise information on said identity of said terminal to be relayed.

16. The system according to claim 15, wherein said inter-terminal paging message comprises at least purpose information indicative of a purpose of said inter-terminal paging message, and said response action is based on said purpose information.

17. The system according to claim 12, wherein the apparatus further comprises transmitting circuitry configured to transmit, to said relay terminal, terminal context information of said terminal to be relayed, wherein said sidelink communication group is selected for said terminal to be relayed based on said terminal context information of said terminal to be relayed.

18. The system of claim 12, wherein the apparatus further comprises configuring circuitry configured to, in relation to an establishment of said demanded sidelink communication group by said establishing circuitry, configure, for said demanded sidelink communication group, inter-terminal paging indicator resources based on demanding terminal related information included in said sidelink communication group establishment demand and on said delay information.

19. The system of claim 12, wherein the apparatus further comprises setting circuitry configured to, in relation to an establishment of said demanded sidelink communication group by said establishing circuitry, set a validity period of said demanded sidelink communication group.

\* \* \* \* \*